United States Patent [19]
Latorre et al.

[11] Patent Number: 5,438,318
[45] Date of Patent: Aug. 1, 1995

[54] MOVEMENT DETECTOR FOR DETECTING MOVEMENT WITHIN A PREDETERMINED SPACE

[75] Inventors: Jack Latorre, Prades-le-Lez; Gerald Espinadel, Nimes, both of France

[73] Assignee: Electro-Univers-Diffusion, Saint Martin de Londres, France

[21] Appl. No.: 232,442

[22] Filed: Apr. 21, 1994

Related U.S. Application Data

[63] Continuation of Ser. No. 829,000, Jan. 31, 1992, abandoned.

[30] Foreign Application Priority Data

Jun. 1, 1990 [FR] France .................. 90/07055

[51] Int. Cl.⁶ .............. G08B 13/18; G08B 29/20
[52] U.S. Cl. ...................... 340/554; 340/515; 367/94
[58] Field of Search .......... 340/552, 553, 554, 425.5, 340/426, 511, 514, 515, 522; 367/93, 94; 342/27, 28

[56] References Cited

U.S. PATENT DOCUMENTS

| | | | |
|---|---|---|---|
| 3,781,859 | 12/1973 | Hermans | 340/514 X |
| 3,851,301 | 11/1974 | Demers | 340/515 X |
| 4,433,328 | 2/1984 | Saphir | 340/554 X |
| 4,527,151 | 7/1985 | Byrne | 340/554 |
| 4,580,249 | 4/1986 | Magee | 340/553 X |
| 4,661,936 | 4/1987 | Magee | 340/554 X |
| 4,673,935 | 6/1987 | Spencer | 340/554 X |
| 4,721,945 | 1/1988 | Maki | 340/514 X |
| 4,929,925 | 5/1990 | Bodine | 340/426 |
| 5,227,764 | 7/1993 | Umemoto | 340/552 |

FOREIGN PATENT DOCUMENTS 0026385 4/1981 European Pat. Off.
8912983 11/1989 Germany.
2137749 10/1984 United Kingdom.

OTHER PUBLICATIONS

*Hobby Electronics*, vol. 3, No. 9, Jul. 1981, pp. 11-13.
Patent Abstracts of Japan, vol. 012, No. 418 (E-678) JP-A-63 155 653 (Matsushita) 28 Jun. 1988.

*Primary Examiner*—Thomas P. Noland
*Assistant Examiner*—Christine K. Oda
*Attorney, Agent, or Firm*—Ostrolenk, Faber, Gerb & Soffen

[57] ABSTRACT

A movement detector includes a transmitter (1) and a receiver (2) of electromagnetic, acoustic or light waves, and a frequency variation demodulator (3) connected to the receiver (2) and adapted to supply a signal which is progressively variable as a function of the movement detected. The movement detector further includes an analog-digital converter (5) which transforms the demodulated signal into a digital signal, a memory (6) connected to the converter (5), and an arrangement for controlling the loading of the memory. The memory (6) continuously makes available information corresponding to a memorized threshold signal. A comparator (8) continuously compares the memorized threshold signal with the signal given off by the demodulator (3) and emits a signal when the former is less than the latter.

14 Claims, 3 Drawing Sheets

MOVEMENT DETECTOR FOR DETECTING MOVEMENT WITHIN A PREDETERMINED SPACE

This is a continuation of application Ser. No. 07/829,000, filed on Jan. 31, 1992, abandoned.

BACKGROUND OF THE INVENTION

1. Field of the Invention

The object of the present invention is a movement detector with automatic adjustment for detecting movement within a predetermined space as a function of conditions detected within the space monitored, intended in particular for the protection of automobiles, apartments, etc.

2. Background Art

The devices known at present for the protection of automotive vehicles simultaneously offer two types of protection, namely:

boundary protection, which employs contacts at doors, motor hood, trunk lid, sunroof, etc.; and space protection which protects the inside space of the car by means of detectors generally put in place by the person installing the protection system. These detectors may be infrared, ultrasonic, infrasonic or ultra-high frequency detectors.

In general, a good security system, therefore, comprises:

a control board which manages the information supplied by the different detectors just mentioned;

a space detector; and an acoustic alarm which is sounded in case of intrusion.

Among the space detectors employed up to the present time, the one most generally used is the ultrasonic detector, which constitutes an effective system of detection but, nevertheless, has certain drawbacks, the installing thereof being subject to a number of constraints, namely:

it is necessary to hermetically to close all the windows of the doors and all the vent holes of the vehicle in order to avoid any vibratory movement in the space protected, and therefore any inadvertent triggering; and the transmitting and receiving parts of the system must be installed in a clearly evident manner and without obstacles between them, which makes them completely vulnerable (to tearing off, blocking, etc.).

It can in no case be installed on so-called convertible cars.

SUMMARY OF THE INVENTION

The object of the present invention is to overcome these drawbacks by proposing a device which has memory means for storing a threshold signal, defined as being the weakest signal perceived by a detector in the space monitored, and means for processing said weakest perceived signal which make it possible to establish and memorize a trigger threshold.

The arrangement which is the object of the present invention thus comprises a transmitter and a receiver of electromagnetic, light or acoustic waves, a demodulator which detects a variation in frequency of the signal received by the receiver and emits a signal which varies progressively as a function of said variation in frequency, an analog-digital converter connected to the demodulator, a rewritable memory connected to the converter, and a comparator which compares the signal coming from the demodulator with the threshold signal stored in the memory and gives out a signal when the former is greater than the latter.

The memorizing is controlled by the user at the time of the installation of the system. At that time, the installer causes a movement of slight speed in the space to be monitored. Thus the device is adjusted so that it will detect all movements of a speed greater than that of the movement memorized.

It should be emphasized that this automatic adjustment procedure can be effected several times, for instance upon a reinstallation of the system.

Various embodiments of the device are possible, with analog or digital circuits, these different modes falling within the scope of the present invention.

The present invention will be better understood from a reading of the following description which refers to the accompanying drawings, it being understood that this description is in no way limitative of the invention.

For reasons of clarity, this description covers the application of the invention to movement detectors based on the Doppler effect and electromagnetic waves emitted within the range of ultra-high frequencies.

DETAILED DESCRIPTION

Figure 1:
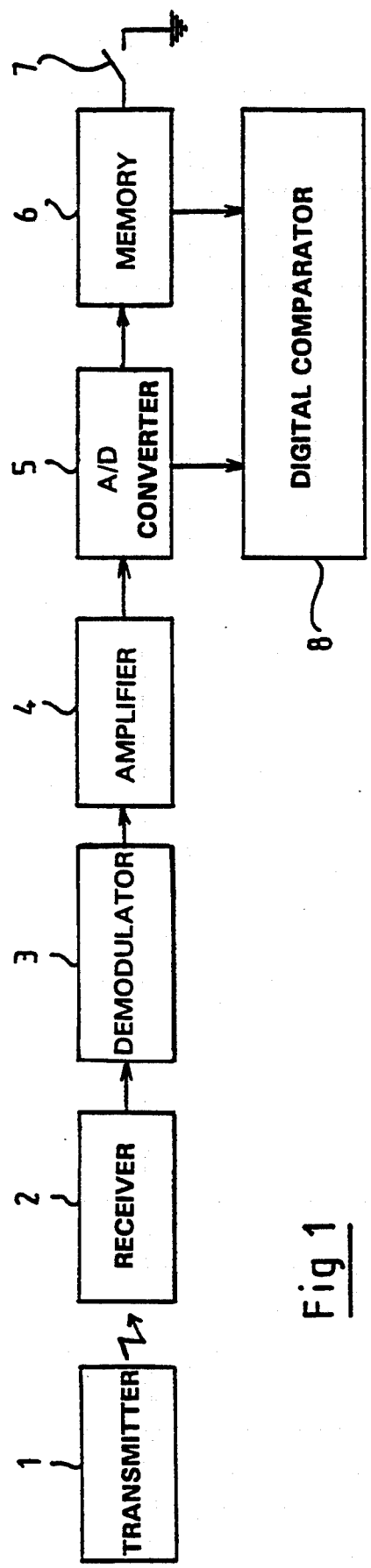
FIG. 1 is a basic diagram of a primarily digital embodiment of the system in accordance with the invention.

Referring first of all to FIG. 1, it is seen that the system in accordance with the invention comprises a transmitter 1, a receiver 2, a demodulator 3 connected to the receiver 2, an amplifier 4 connected to the demodulator 3, an analog-digital converter 5 connected to the amplifier 4, a rewritable memory 6 connected to the converter 5 and to an on-off switch 7, and a digital comparator 8 connected to the memory 6 and the converter 5.

The operation of the device is as follows:

The transmitter 1 and the receiver 2 being adapted to use the same wavelengths, displacement of an object within the area of transmission and reception of these components produces, by the Doppler effect, a variation in the frequency received by the receiver 2. The demodulator 3 extracts this variation from the signal received by the receiver 2 and gives off a signal which varies as a function of this variation in frequency. The amplifier 4 amplifies this signal, which is then converted into digital information by the analog-digital converter 5.

When the on-off switch 7 is closed, the rewritable memory 6 memorizes the digital signal corresponding to the variation in frequency caused by the displacement of the object.

When the on-off switch 7 is open, the memory 6 continuously transmits the memorized information and the digital comparator 8 compares the signal coming from the converter 5 with the signal coming from the memory 6. When the former is greater than the latter, the comparator 8 emits a signal corresponding to the desired detection.

It is to be noted that the demodulator 3 and the amplifier 4 can be reversed in the arrangement, and that the amplifier 4 may also be located at the outlet end of the device, behind the comparator 8.

Figure 3:
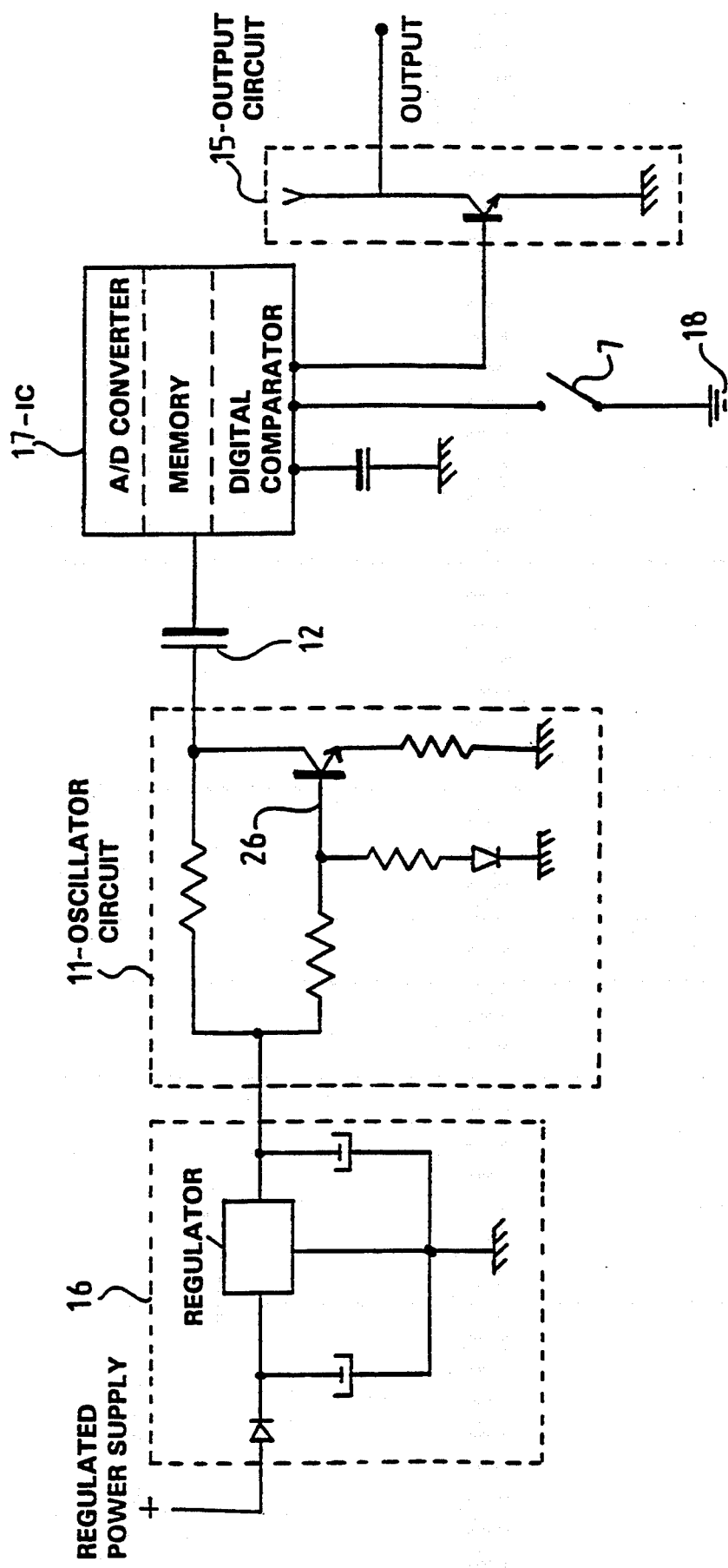
FIG. 3 shows an electronic circuit which is a concrete example of the embodiment of the system shown in FIG. 1.

Furthermore, the transmitter 1, the receiver 2 and the demodulator 3 can be combined in a single circuit, in particular in a circuit which places the space monitored in resonance. FIG. 3 shows such a circuit.

Figure 2:
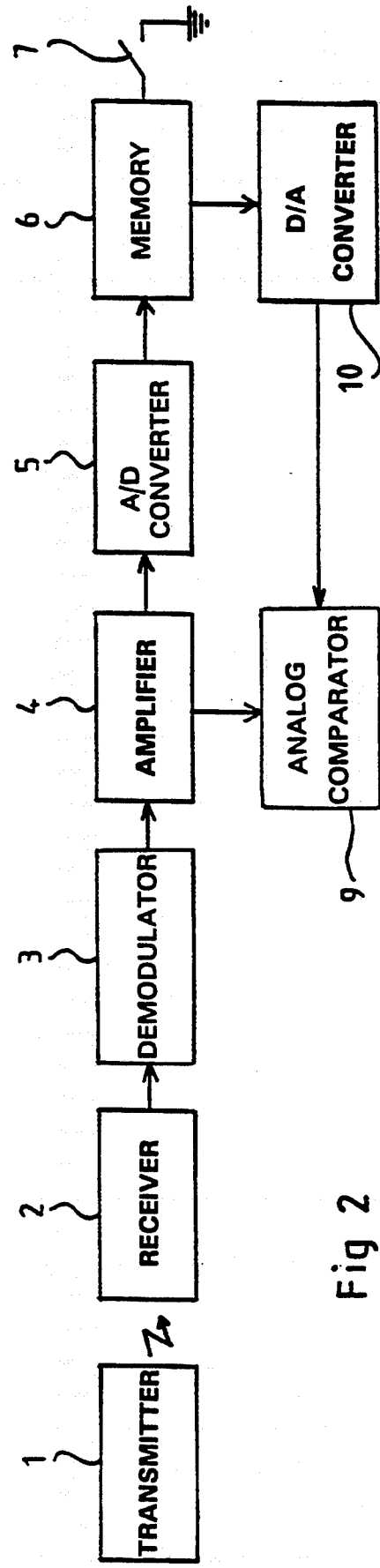
FIG. 2 is a basic diagram of a primarily analog embodiment of the system of the invention.

Referring now to FIG. 2, the same parts can be noted as shown in FIG. 1, with the exception of the digital comparator 8. At the outlet of the memory 6 there is a digital-analog converter 10, connected, on the one hand, to said memory 6 and, on the other hand, to an analog comparator 9. Said comparator 9 is furthermore connected to the amplifier 4 and compares the signals coming from said amplifier 4 with those coming from the digital-analog converter 10.

The operation of this circuit is identical to that of the circuit shown in FIG. 1, except that the comparison is effected in analog rather than in digital mode.

FIG. 3 shows an electronic circuit which permits an application of the present invention to a detection circuit of known type.

This electronic circuit comprises a regulated electric power supply circuit 16, an oscillator circuit 11, a coupling capacitor 12, an integrated circuit 17, an on-off switch 7, an electrical ground 18, and an output circuit 15.

The integrated circuit 17 is preferably of the "ASIC" type, that is to say, it comprises analog sub-assemblies and digital sub-assemblies.

The integrated circuit 17 incorporates the functions of analog-digital conversion, memorization and comparison shown in FIGS. 1 and 2, in particular for the components 5, 6 and 8.

The oscillator circuit 11 performs the functions of transmission, reception and demodulation shown in connection with FIGS. 1 and 2. In particular, the transmitting and receiving antenna is formed by the base 26 of the transistor. The variations in frequency upon reception are amplified by the transistor and cause the charge of the capacitor 12 to vary.

The on-off switch 7 is connected to the memory incorporated in the integrated circuit 17 and to the electrical ground 18 in such a manner that the memorization takes place when the on-off switch 7 is closed.

Depending on the signal given by the comparator incorporated in the circuit 17, the output circuit 15 supplies a positive voltage or zero voltage. The output voltage is zero if a detection has been effected, that is to say, if the amplified signal is greater than the threshold signal.

The operation of this circuit is identical to that described with reference to FIGS. 1 and 2 and provides a signal the voltage of which is zero in case of detection in the space monitored.

Figure 4:
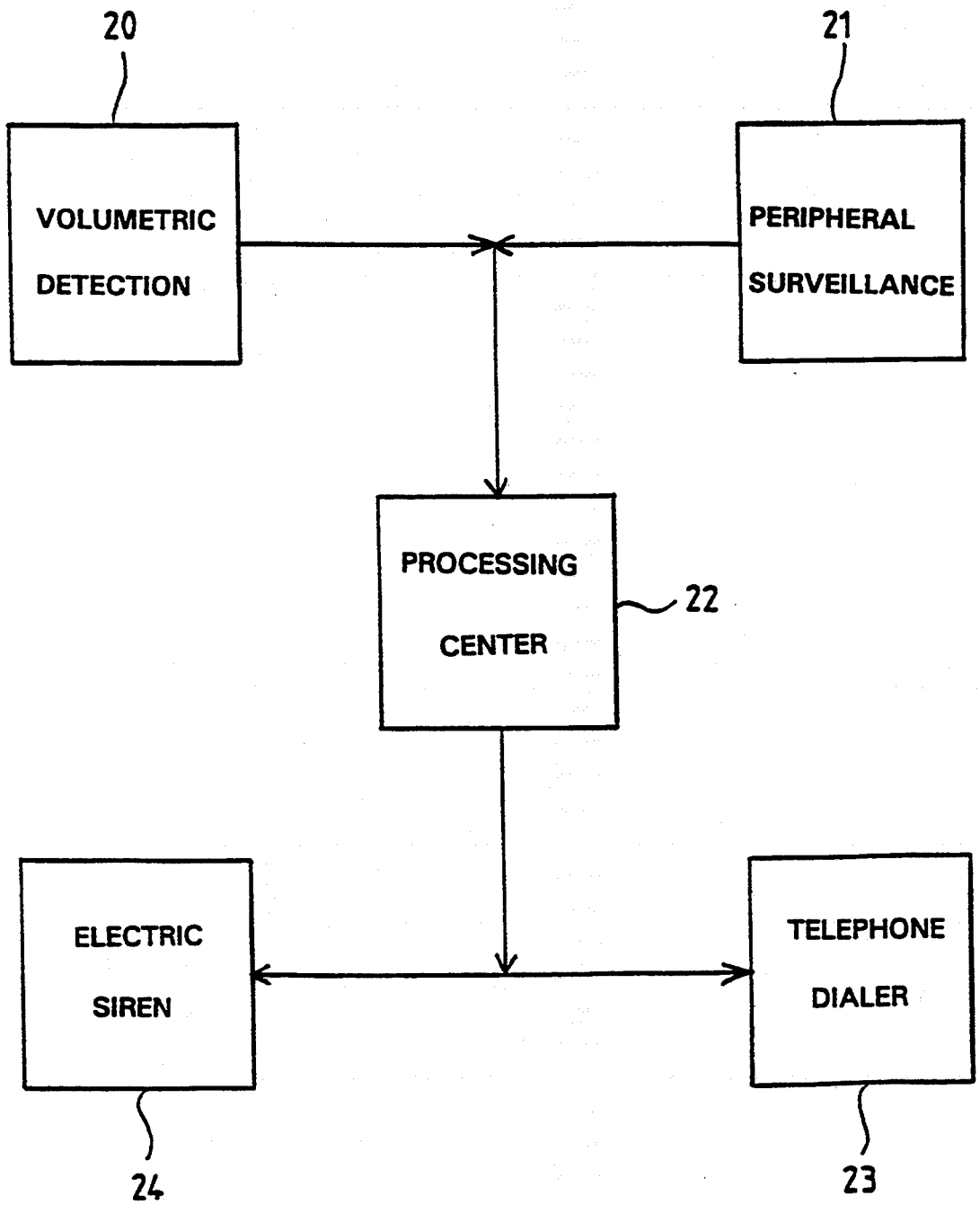
FIG. 4 shows a diagram representing a possible use of the system forming the object of the invention in an alarm center.

If one refers, finally, to FIG. 4, there can be noted the diagram of an automatic regulation alarm center employing the system forming the object of the invention. This alarm center comprises a movement detection circuit 20, a periphery monitoring circuit 21, a processing center 22, a telephone dialer 23 and an electric siren 24.

The movement detection circuit 20 is as shown in one of the preceding figures and preferably in FIG. 3. The peripheral monitoring circuit 21 detects the opening of electric switches connected to openings in the space monitored, for instance doors or windows. The processing center 22 processes the information coming from the circuits 20 and 21 and eliminates detections which are not verified or repeated. Finally, the telephone dialer 23 and the siren 24 permit transmitting the alarm.

The detector of the invention is adapted to monitor automobiles or apartments and has the advantage that it is not necessary for the space to be closed in order for the alarm to operate.

The detector of the invention can easily be adapted to any movement detection device, whether based on acoustic, light or electromagnetic waves, since it memorizes a threshold signal corresponding to a movement which is considered the slightest which it is necessary to detect, this threshold signal serving as a detection threshold signal, as described above.

The present invention is, of course, not limited to the preceding description of one of its embodiments, but various changes may be made in it without thereby going beyond the scope of the invention.

We claim:

1. A device for detecting movement in an area, comprising:
    a transmitter which is operable for transmitting a signal into the area;
    a receiver which is operable for receiving a signal from the area, said receiver being responsive to said transmitted signal, said receiver supplying an output signal in response to the received signal, said output signal being a function of movement within the area;
    memory means including a memory for storing information representing a reference level of the receiver output signal indicative of a threshold level of detected motion in the area;
    said memory means including a switch connected to said memory for being closed momentarily to cause said memory to store said reference level of the received signal and for being opened to cause said memory means to continuously supply said stored reference level as an output of said memory means; and
    means for comparing the receiver output signal to the stored reference level and generating an output signal when the received signal exceeds the reference level;
    wherein said switch is disposed for being operable by a user who is located in the area where movement is being detected, so as to permit the user to simultaneously make a threshold-level movement in the area and operate said switch, and thereby cause said reference level to be stored in said memory.

2. A device according to claim 1, wherein the means for comparing includes an analog-digital converter connected to the receiver and a digital comparator connected to the analog-digital converter and to the memory means.

3. A device according to claim 1, wherein the means for comparing includes a digital-analog converter connected to the memory means and an analog comparator connected to the receiver and to the digital-analog converter.

4. A device according to claim 1, in which the transmitted signal is electromagnetic radiation in the ultra-high frequency range.

5. A device for detecting movement in an area, comprising:

a transmitter which is operable for transmitting a signal into the area;

a receiver which is operable for receiving a signal from the area, said receiver being responsive to said transmitted signal, said receiver supplying an output signal in response to the received signal, said output signal being a function of movement within the area;

a memory for storing information representing a reference level of the receiver output signal indicative of a threshold level of detected motion in the area;

a switch connected to said memory which is operable to cause said memory to store said reference level of the received signal and to cause said memory to supply said stored reference level as an output of said memory; and a comparator for comparing the receiver output signal to the stored reference level and generating an output signal indicative of movement in the area, in response to the comparison of the received signal and the reference level;

wherein said switch is disposed for being operable by a user who is located in the area where movement is being detected, so as to permit the user to simultaneously make a threshold-level movement in the area and operate said switch, and thereby cause said reference level to be stored in said memory.

6. A device according to claim 1, wherein said switch has a closed position in which said switch causes said memory to store said reference level of the received signal, and an open position wherein said memory means continuously supplies said stored reference signal as an output of said memory means.

7. A device according to claim 5, wherein said switch has a first position in which said switch causes said memory to store said reference level of the received signal, and a second position wherein said memory supplies said stored reference signal as an output of said memory.

8. A device according to claim 7, wherein said switch is closed in said first position and open in said second position.

9. A device according to claim 8, wherein said memory is responsive to momentary closing of said switch in said first position.

10. A device according to claim 8, wherein said memory continuously supplies said stored reference signal as an output of said memory.

11. A device according to claim 5, wherein the comparator includes an analog-digital converter connected to the receiver and a digital comparator circuit connected to the analog-digital converter and to the memory.

12. A device according to claim 5, wherein the comparator includes a digital-analog converter connected to the memory and an analog comparator circuit connected to the receiver and to the digital-analog converter.

13. A device according to claim 5, in which the transmitted signal is electromagnetic radiation in the ultra-high frequency range.

14. A device according to claim 5, wherein said comparator generates said output signal when the received signal exceeds said reference level.

* * * * *